United States Patent
Jonsson et al.

(10) Patent No.: US 7,239,677 B2
(45) Date of Patent: Jul. 3, 2007

(54) METHOD AND APPARATUS FOR SOFT SYMBOL SCALING

(75) Inventors: Elias Jonsson, Malmö (SE); Anders Ericsson, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 805 days.

(21) Appl. No.: 10/426,254

(22) Filed: Apr. 29, 2003

(65) Prior Publication Data

US 2004/0218698 A1    Nov. 4, 2004

(51) Int. Cl.
*H04L 27/06* (2006.01)

(52) U.S. Cl. .................. 375/343; 375/347; 375/349

(58) Field of Classification Search ................ 375/343, 375/347, 349
See application file for complete search history.

(56) References Cited

U.S. PATENT DOCUMENTS

| | | | |
|---|---|---|---|
| 5,305,349 | A |  4/1994 | Dent |
| 5,572,552 | A | 11/1996 | Dent et al. |
| 5,764,690 | A |  6/1998 | Blanchard et al. |
| 5,852,630 | A * | 12/1998 | Langberg et al. ........... 375/219 |
| 6,175,587 | B1 |  1/2001 | Madhow et al. |
| 6,192,066 | B1 * |  2/2001 | Asanuma .................... 375/130 |
| 6,363,104 | B1 |  3/2002 | Bottomley |
| 6,714,585 | B1 * |  3/2004 | Wang et al. ................. 375/148 |
| 6,839,378 | B1 * |  1/2005 | Sourour et al. ............. 375/142 |
| 7,075,974 | B2 * |  7/2006 | Ohsuge ....................... 375/152 |
| 2001/0028677 | A1 | 10/2001 | Wang et al. |
| 2002/0061056 | A1 |  5/2002 | Smolyar |
| 2002/0106039 | A1 |  8/2002 | Sugita |
| 2002/0131479 | A1 |  9/2002 | Butler et al. |
| 2002/0159507 | A1 | 10/2002 | Flaig et al. |
| 2003/0114125 | A1 |  6/2003 | Sourour et al. |

FOREIGN PATENT DOCUMENTS

| | | |
|---|---|---|
| EP | 0 749 215 A2 | 5/1996 |
| EP | 0993127 A1 | 4/2000 |
| EP | 0994570 A1 | 4/2000 |
| EP | 1126626 A2 | 8/2001 |
| EP | 1229668 A2 | 8/2002 |
| EP | 1 265 377 A2 | 12/2002 |
| WO | WO 95/34140 A1 | 12/1995 |

(Continued)

*Primary Examiner*—Mohammed Ghayour
*Assistant Examiner*—M. (Ben) Benghuzzi
(74) *Attorney, Agent, or Firm*—Potomac Patent Group PLLC (57) ABSTRACT

Methods of scaling path delay values in a communication system, in which estimates of received symbols corresponding to the path delays are combined, include the step of determining a respective weight value for each path delay based on relative correlations of the path delays. The weight values may be determined by getting a plurality of path delay values; identifying the path delay values as either peak values or neighbor values; organizing the peak values and neighbor values into groups, with each group including at least one peak value and at least one neighbor value; for each group, determining a set of weight values; and checking the groups for duplicated path delay values and selecting a weight value from the weight values determined for the duplicated path delay values as either one of the weight values for the duplicated path delay values or a combination of the weight values for the duplicated path delay values. Receivers in digital communication systems and computer-readable media are also disclosed.

14 Claims, 3 Drawing Sheets

FOREIGN PATENT DOCUMENTS

| WO | 00/25438 | 5/2000 |
| WO | 01/01595 A1 | 1/2001 |
| WO | WO 01/1594 A1 | 1/2001 |
| WO | 02/11308 A1 | 2/2002 |
| WO | 02/43266 A2 | 5/2002 |
| WO | 02/093770 A1 | 11/2002 |
| WO | WO 02/093764 A1 | 11/2002 |

* cited by examiner

METHOD AND APPARATUS FOR SOFT SYMBOL SCALING

BACKGROUND

Applicants' invention relates to methods and apparatuses for receiving electromagnetic signals, and more particularly to coherent receivers in digital communication systems.

Digital communication systems include time-division multiple access (TDMA) systems, such as cellular radio telephone systems that comply with the GSM and TIA-136 telecommunication standards and their enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the UMTS telecommunication standard. This application focusses on CDMA systems for simplicity, but it will be understood that the principles described in this application can be implemented in TDMA and other digital communication systems.

In a CDMA communication system, an information data stream representing, for example, speech to be transmitted, is impressed upon a higher-rate data stream that may be called a "signature sequence" or a "spreading sequence". Typically, the signature sequence is a binary bit stream that can be replicated by an intended receiver. The information data stream and the signature sequence stream are combined by multiplying the two bit streams together, assuming the binary values of the two bit streams are represented by +1 or −1. This combination of a higher-bit-rate signature sequence with a lower-bit-rate data stream is called "spreading" the lower-bit-rate data stream. It will be understood that information data streams may be encoded for error correction and other reasons and may be combined with other binary sequences that have useful cross—and auto-correlation properties, e.g., Walsh-Hadamard sequences, before the resulting combinations are spread.

A plurality of spread information streams can modulate a radio-frequency (RF) carrier, for example by phase shift keying (PSK), and then be jointly received as a composite signal at a receiver. Each of the spread information signals overlaps all of the other spread signals, as well as noise-related signals, in both frequency and time. The spread information signals can be isolated by correlating the composite signal with the signature sequence, and then the information signals can be reconstituted by decoding appropriately.

Among other things, a coherent receiver in a digital communication system estimates the impulse response of the communication channel through which signals pass from the transmitter to the receiver to optimize its performance. The channel is typically modelled as a tapped delay line, in which the tap locations correspond to signal ray, or path, time delays and the generally complex tap coefficients correspond to channel coefficients. The result of the channel estimation process is a set of estimates of the tap locations and coefficients that is provided to a signal demodulator. The set of estimates is usually obtained through some combination of coherent and non-coherent values that are produced by correlating the received signal with a predetermined training sequence, in TDMA systems, or with a signature sequence, in CDMA systems. For TDMA and other narrow-band communication systems, the demodulator is usually a coherent detector, such as a DFE or MLSE equalizer. For CDMA and other wideband communication systems, the demodulator is usually a RAKE receiver.

This sort of receiver is used in many digital communication systems because transmitted signals are reflected by objects, like buildings and mountains, between the transmitter and receiver. Thus, a transmitted signal propagates to the receiver along not one but many paths so that the receiver hears many echoes, or rays, having different and randomly varying delays and amplitudes. In a CDMA communication system, the receiver receives multiple versions of the transmitted composite signal that have propagated along different paths, some of which may have relative time delays of less than one chip. As a result of such time dispersion and in the absence of a RAKE receiver, correlating the received signal with a signature sequence would produce an output having several smaller spikes rather than one large spike. The several spikes are combined in an appropriate way by the RAKE receiver, which is so named because it "rakes" all the multipath contributions together.

Figure 1:
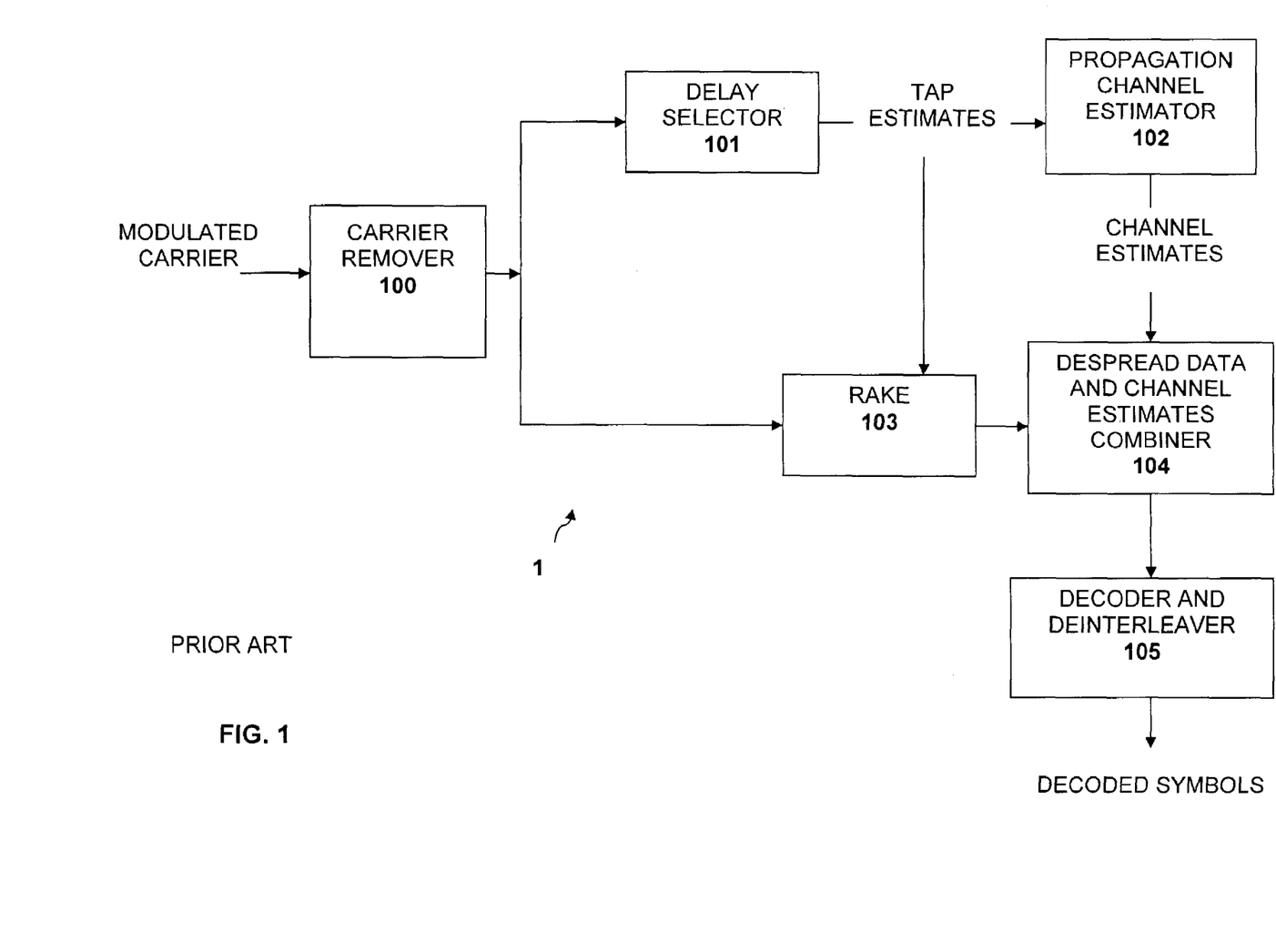
FIG. 1 is a block diagram of a known receiver for a digital communication system.

FIG. 1 is a block diagram of a typical coherent receiver 1 for a CDMA-type digital communication system. A carrier removal block 100 depicts components used for receiving a modulated carrier signal and extracting the modulation from the carrier, which is a process of signal down-conversion from the spectral region of the carrier to the spectral region of the modulation, usually base band. The modulation, or base-band spread signal, is provided to a delay selector block 101 that determines a set of estimates of tap locations and coefficients, i.e., a set of delays, for the different signal echoes received. This set of estimates is provided to a propagation channel estimator block 102 as described above. The delays can be determined by correlating the received signal with a known portion of the transmitted signal, such as pilot symbols or training sequences, over a pre-defined time window, and selecting from the correlation values based on received power or signal-to-interference ratio (SIR). The pilot or training symbols are used in estimating the impulse response of the propagation channel in block 102 as described.

Many devices and methods for determining and selecting echoes may be used. For example, use of complex delay profiles, which can be averaged to form a power delay profile, is described in U.S. patent application Ser. No. 09/005,580 filed on Jan. 12, 1998, by E. Sourour et al. for "Method and Apparatus for Multipath Delay Estimation for Direct Sequence Spread Spectrum Communication Systems". Other devices and methods for determining and selecting echoes are described in U.S. patent application Ser. No. 10/017,745 filed on Dec. 14, 2001, by E. Sourour et al. for "Interference Suppression in a Radio Receiver"; and U.S. Provisional Patent Applications No. 60/412,321 filed on Sep. 23, 2002, by X. Wang et al. for "Efficient Multipath Detections" and No. 60/412,899 filed on Sep. 23, 2002, by E. Jonsson for "Objective Multi-path Delay Selection Algorithm for WCDMA".

The base-band spread signal is also provided to a RAKE block 103 that includes a number of "fingers", or de-spreaders, that are each assigned to respective ones of the selected echoes. Of course, it will be appreciated that the RAKE block could include one finger that is re-used for each selected echo if the block operates fast enough. Each finger combines an echo selected by block 101 with the spreading sequence so as to de-spread the received composite signal. The RAKE block 103 typically de-spreads both sent information data and pilot or training symbols that are included in the composite signal. It will be appreciated that one or more fingers of the RAKE receiver block can be used in the delay selection block 101 to determine the echo delays that are selected. Such fingers are sometimes called "path searchers".

Various aspects of RAKE receivers are described in G. Turin, "Introduction to Spread-Spectrum Antimultipath Techniques and Their Application to Urban Digital Radio", Proc. IEEE, vol. 68, pp. 328–353 (March 1980); U.S. Pat. No. 5,305,349 to Dent for "Quantized Coherent Rake Receiver"; U.S. Patent Application Publication No. 2001/0028677 by Wang et al. for "Apparatus and Methods for Finger Delay Selection in Rake Receivers"; U.S. patent applications Ser. No. 09/165,647 filed on Oct. 2, 1998, by G. Bottomley for "Method and Apparatus for Interference Cancellation in a Rake Receiver" and Ser. No. 09/344,898 filed on Jun. 25, 1999, by Wang et al. for "Multi-Stage Rake Combining Methods and Apparatus".

In a combiner block 104, de-spread information data is multiplied by the complex conjugates of respective propagation channel estimates to remove distortion introduced by the propagation channel. The products are summed over the selected number of delays and fed to a decoder and de-interleaver block 105, which may include a Viterbi decoder or a Turbo decoder, for example. The block 105 produces decoded symbols that replicate the transmitted information data.

For a digital receiver implemented in one or more integrated circuits, the decoder and de-interleaver can require a large area of silicon, and it is therefore desirable to keep the number of bits used to represent numbers in this block as low as possible. If the delays provided from the RAKE block 103 to the combiner 104 are highly correlated, then the combiner adds, in effect, the same signal twice. This can cause serious loss of soft information due to overflow after truncating the outputs of the combiner due to the limited number of bits in the decoder. Besides the absence of true diversity combining and its benefits, this results in deteriorated decoding performance, particularly when the delay selector 101 chooses multiple delays that all originate from the same path. This is likely when the selector's delay resolution is less than one chip and is due to temporal broadening of the echoes by pulse shaping of the transmitted signal.

SUMMARY

Applicants have recognized that these and other problems can be solved by selectively scaling the delays used in the combiner to retain soft information, regardless of the degree of correlation of the delays. This results in improved decoder performance.

In one aspect of Applicants' invention, a method of scaling path delay values in a communication system, in which estimates of received symbols corresponding to the path delays are combined, includes the step of determining a respective weight value for each path delay based on relative correlations of the path delays. The weight values may be determined by getting a plurality of path delay values; identifying the path delay values as either peak values or neighbor values; organizing the peak values and neighbor values into groups, with each group including at least one peak value and at least one neighbor value; for each group, determining a set of weight values; and checking the groups for duplicated path delay values and selecting a weight value from the weight values determined for the duplicated path delay values as either one of the weight values for the duplicated path delay values or a combination of the weight values for the duplicated path delay values.

In another aspect of Applicants' invention, a receiver for signals transmitted in a digital communication system, the signals including transmitted symbols, includes a delay selector that determines sets of path delays for received signal echoes; a propagation channel estimator that determines estimates of an impulse response of a channel through which the transmitted signals have propagated; a demodulator that determines estimates of the transmitted symbols; a propagation channel weights computer that determines weight values for path delays determined by the delay selector based on relative correlations of the path delays; and a combiner that combines the estimates of the impulse response, the estimates of the transmitted symbols, and the weight values, wherein the weight values scale the estimates for the combiner.

The propagation channel weights computer may determine weight values for path delays by identifying the path delays as either peaks or neighbors; organizing the peak and neighbors into groups, with each group including at least one peak and at least one neighbor; determining a set of weight values for each group; and checking the groups for duplicated path delays and selecting a weight value from the weight values determined for the duplicated path delays as either one of the weight values for the duplicated path delays or a combination of the weight values for the duplicated path delays.

In another aspect of Applicants' invention, a computer-readable medium contains a computer program for scaling path delay values in a communication system in which estimates of received symbols corresponding to the path delays are combined. The computer program performs the step of determining a respective weight value for each path delay based on relative correlations of the path delays. The weight values may be determined by at least the steps of getting a plurality of path delay values; identifying the path delay values as either peak values or neighbor values; organizing the peak values and neighbor values into groups, with each group including at least one peak value and at least one neighbor value; for each group, determining a set of weight values; and checking the groups for duplicated path delay values and selecting a weight value from the weight values determined for the duplicated path delay values as either one of the weight values for the duplicated path delay values or a combination of the weight values for the duplicated path delay values.

BRIEF DESCRIPTION OF THE DRAWINGS

The various features, objects, and advantages of this invention will be apparent from reading this description in conjunction with the drawings, in which.

DETAILED DESCRIPTION

This description is given in terms of a CDMA radio communication system for convenience only, and it will be appreciated that the principles of this invention can be applied in other digital communication systems having suitable characteristics. For example, those skilled in the art will appreciate that the teachings of the invention are equally applicable in any communication system in which it is desirable to optimize receiver performance in the presence of transmitted signal echoes.

Figure 2:
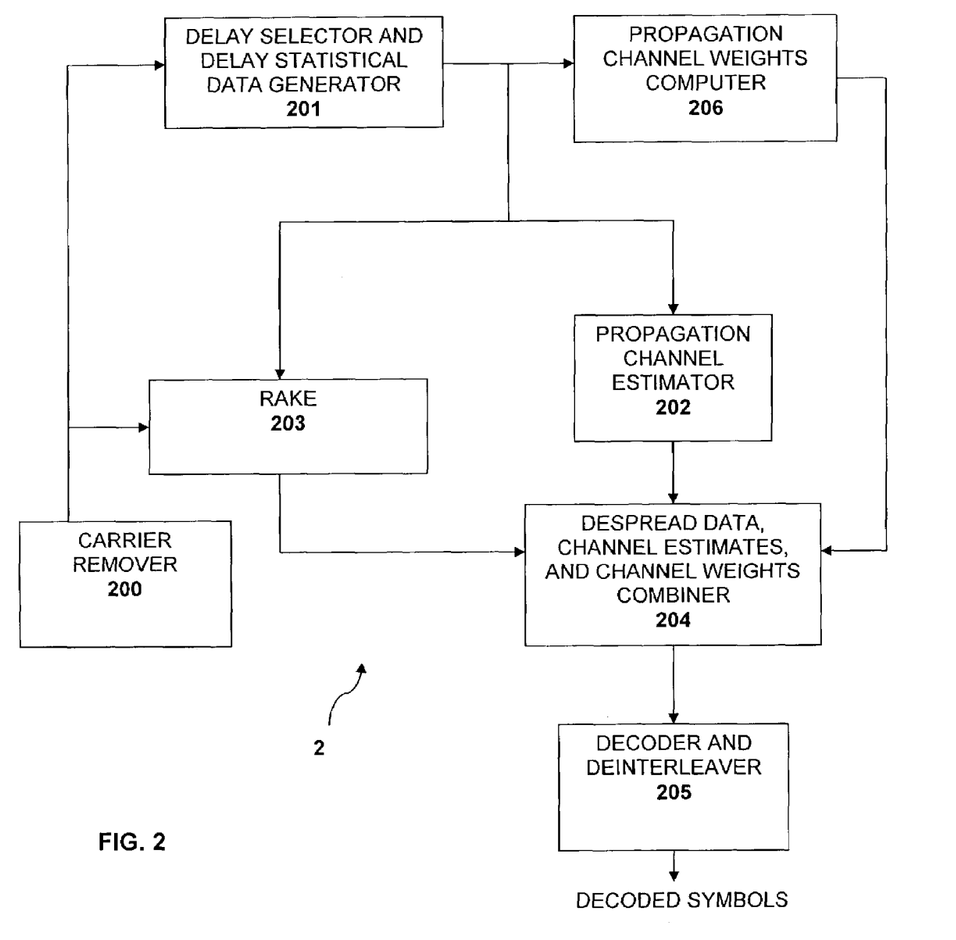
FIG. 2 is a block diagram of a receiver for a digital communication system in accordance with Applicants' invention.

FIG. 2 is a block diagram of a receiver 2 in a digital communication system that is in accordance with Applicants' invention. The carrier remover block 200, propagation channel estimator block 202, rake block 203, and decoder and de-interleaver block 205 operate in substantially the same way as the corresponding blocks in FIG. 1. FIG. 2 includes a propagation channel weights computer block 206, which computes weights for each path delay that are used in the combiner block 204 as described in more detail below. Briefly stated, the data symbols of the selected paths are multiplied by the complex conjugates of the respective propagation channel estimates and by the respective computed weights, and the resulting symbols are added together over the number of delays as before, truncated, and fed to the de-interleaver and decoder.

Notation and System Modelling

Let u and v be complex numbers, u* be the complex conjugate of u, and |u| be the length of the vector u. Given a complex vector w, $\|w\|=|w_1|^2+ \ldots +|W_n|^2$, where n is the number of elements in the vector w. Let x be a random variable and E(x) be the expectation value of x. Let 1 be a n×1 vector consisting of ones. Let I be the identity matrix. Assume that the received despread signal for delay f can be written as follows:

$$r_f = h_f s + n_f$$

where $h_f$ is the impulse response of the propagation channel, s is the transmitted symbol, and $n_f$ is noise. For computing the weights in block 206, the following expressions can be used:

$$y_f = (\hat{h}_f s^{(p1)})^* r_f^{(p1)} = (\hat{h}_f s^{(p1)})^* h_f s^{(p1)} + (\hat{h}_f s^{(p1)})^* n_f$$

$$z_f = (s^{(p2)})^* r_f^{(p2)} = \hat{h}_f + (s^{(p2)})^* n_f$$

where $\hat{h}_f$ is proportional to the propagation channel estimate. The propagation channel estimates may also be weighted by signal interference measurements or adjusted in other suitable ways to give $\hat{h}_f$. In the preceding expressions, $r_f^{(p1)}$ denotes the received pilot symbols (or training sequences) for the physical channel p1 and $s^{(p1)}$ denotes the corresponding transmitted pilot symbols (or training sequences). The notation for the second physical channel p2 corresponds to the notation for physical channel p1. In a WCDMA communication system, p1 could be a dedicated physical channel (DPCH) and p2 could be a common pilot channel (CPICH) for a downlink reception.

In the channel estimator block 202, $\hat{h}_f$ is used as the channel estimates, and the $y_f$ and $z_f$ are computed in block 201, which also determines and selects echoes for further processing as described in the U.S. patent applications that are cited above and that are incorporated here by reference. The $y_f$ can be considered a measure of how much signal energy is contained in the path delay f, and the $z_f$ can be considered an estimate of the propagation channel. The $y_f$ and $z_f$ are computed using the pilot symbols or other transmitted symbols that are known to the receiver in advance. In block 201, the correlation matrix R is computed, the elements of which are given by:

$$R_{ij} = E((y_i)^* y_j)$$

In a practical receiver, it is believed to be sufficient to estimate the matrix R by filtering the samples $(y_i)^* y_j$.

Block 201 further computes a normalized correlation matrix C, the elements of which are given by:

$$C_{ij} = \frac{|E(\text{Re}((z_i) * z_j))|}{\sqrt{E(|z_i|^2)} \sqrt{E(|z_j|^2)}}$$

and a mean energy vector M, the elements of which are given by:

$$M_f = E(y_f)$$

It will be observed that each $M_f$ is a complex number.

The combiner 204 then combines the despread data, channel estimates, and channel weights according to the following expression:

$$\sum_{f=1}^{F} w_f \hat{h}_f * r_f^{(data)}$$

where $r_f^{(data)}$ are the received data symbols.

Figure 3:
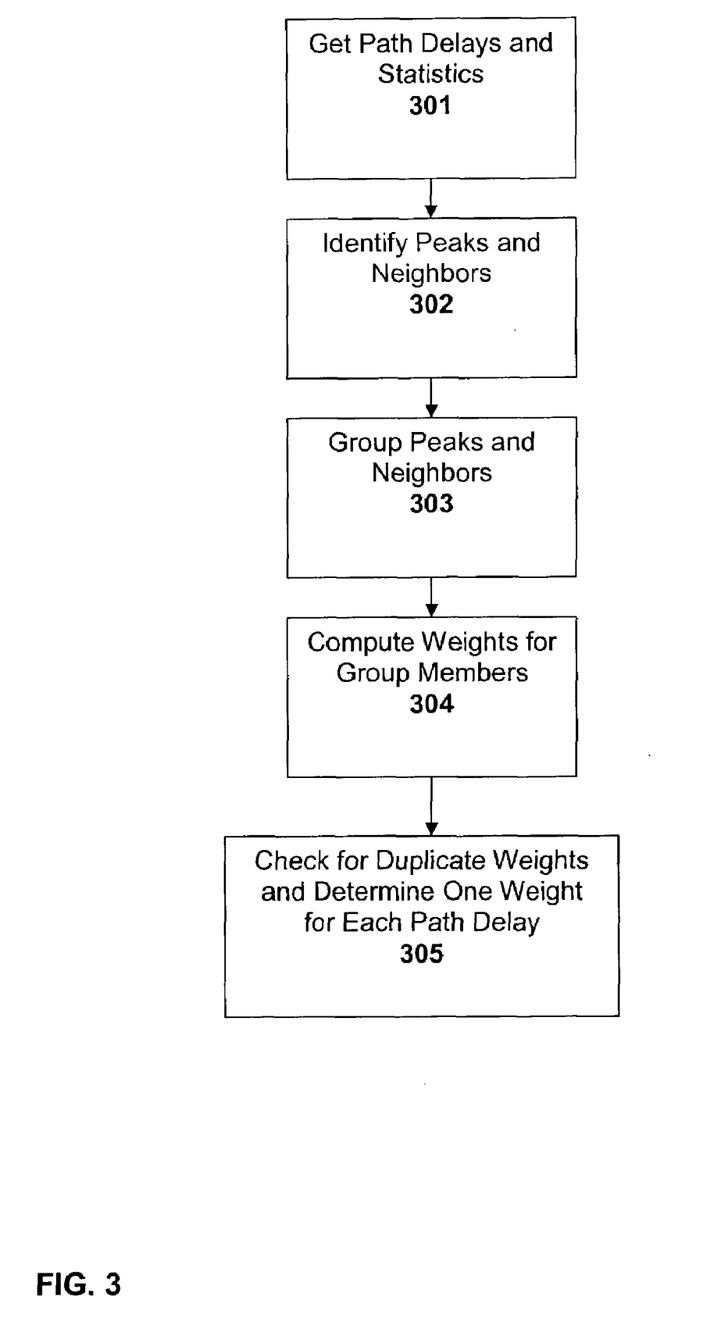
FIG. 3 is a flow chart of a method of weighting channel contributions.

As described above, block 206 generates propagation channel weights that enable optimal soft symbol scaling in the combiner 204. FIG. 3 is a flow chart of a method of weight generation that may be carried out in block 206.

In step 301, block 206 gets from the delay selector 201 the delays that should be used for despreading and combining the received data and statistical measures about the delays. In particular, block 206 obtains the matrices R and C and the vector M as the statistical measures, which should be adequate after a number of chips on the order of 100 have been processed.

In step 302, the selected delays are identified as either peaks or neighbors. This identification can be carried out by first finding the delays with the largest $|E(y_f)|$, or equivalently the largest $|M_f|$, e.g., by ranking the delays selected by the selector block 201, and identifying or tagging those as peaks. Then for each peak, the delays within a selected distance δ to the peak are found, and each such delay is identified or tagged as a neighbor of that peak. It is currently believed that δ is usually a distance of one-quarter, one-half, or three-quarters of a chip and that in general, neighbors need not be adjacent to each other. These steps are repeated for remaining non-identified delays until all delays have been identified.

In step 303, the identified peaks and neighbors are grouped such that each group contains exactly one peak and its neighbors. It will be understood that a delay may belong to different groups as a neighbor.

In step 304, weights are computed for the delays in each group without concern about delays that are duplicated in other groups. In the following three example computations, a group of delays indexed by $f_1$, $f_2$, and $f_3$ has $y_{f1}$, $y_{f2}$, and $y_{f3}$ as the $y_f$ values associated with the delays, and the delay indexed by $f_2$ is identified as the peak. In these examples, it is assumed that each group includes three delays.

In the first example computation, block 206 computes weights for group members based on the signal energy contained in the group. The signal energy is given by:

$$\Omega = (1 - C_{f1f2})M_{f1} + (1 - C_{f2f3})M_{f3} + M_{f2}$$

From this expression, Ω can be seen as the uncorrelated energy or SIR of the group. It will be noted that the signal energy from the same path is not allowed to be added twice. If all group delays are uncorrelated, it can be seen that:

$$\Omega = M_{f1} + M_{f3} + M_{f2}$$

which is not surprising since this arrangement reflects maximal diversity. At the opposite extreme when all group delays are correlated, we have:

$$\Omega = M_{f2}$$

which is also not surprising since this arrangement counts the energy from the peak only if the neighbors are completely correlated with the peak. The weight vector $w=(w_{f1}, w_{f2}, w_{f3})$ is computed such that it minimizes the following mean square error expression:

$$E(|w_{f1}y_{f1} + w_{f2}y_{f2} + w_{f3}y_{f3} - |\Omega||^2) + \beta\|w-1\|^2$$

The solution to the preceding expression is given by:

$$w = (R + \beta I)^{-1}(|\Omega|M^* + \beta 1)$$

It can be seen that if the parameter $\beta$ is selected to be large, the weight vector $w$ is proportional to the all-one vector $1$, and the larger that $\beta$ is chosen to be, the more the weights are pushed to the value one, which has the effect of no weighting. Another purpose of $\beta$ is to regularize the minimization problem, i.e., to guarantee that the inverse of the solution of the mean square error expression exists. Thus, choosing $\beta > 0$ guarantees that $R + \beta I$ has full rank, i.e., that its inverse exists. For a group comprising a peak and two neighbors, the inverse of a 3×3 matrix can be computed quickly and easily by hardware.

The value of $\beta$ depends in part on how the channel estimates are generated by the estimator 202, which advantageously implements channel estimation in the manner described in U.S. patent application Ser. No. 09/344,899 filed on Jun. 25, 1999, by E. Wang et al. for "RAKE Combining Methods and Apparatus Using Weighting Factors Derived from Knowledge of Spread Spectrum Signal Characteristics". Channel estimation weighted by interference is also described in Proakis, *Digital Communications*, 3rd ed., McGraw-Hill. It is currently believed that it is advantageous to choose $\beta$ as approximately ¼ of $\Omega$.

In the second example computation, block 206 computes weights for group members in a simpler but less accurate approach by setting the weights as follows:

$$w_{f1} = 1 - C_{f1f2}$$

$$w_{f2} = 1$$

$$w_{f3} = 1 - C_{f2f3}$$

which can be seen as penalizing neighboring delays that are highly correlated with the peak.

In the third example computation, block 206 computes weights for group members even more simply by setting the weights as follows:

$$w_{f1} = a(1-\tau)$$

$$w_{f2} = a$$

$$w_{f3} = a(1-\tau)$$

for selected constants $a$ and $\tau$. It is currently believed that $a$ should be chosen between 0.8 and 1.5 and that it is particularly advantageous to choose $a=1$. It is also currently believed that $\tau$ should be chosen between 0.4 and 1 and that it is particularly advantageous to choose $\tau = 0.75$.

Returning to FIG. 3, step 305 provides for checking for duplicate weights and determining one weight for each path delay. Some delays that have been identified as neighbors may be contained in two groups and therefore have two computed weight values. In this case, the weight with the minimum absolute value may be selected in order to minimize the impact of the contribution of neighboring delays in the combining of the sent data when it has been determined that a neighbor is correlated to a peak.

For a group comprising only two delays, the above-described computations are the same but with all terms involving $f_3$ removed.

For a group comprising five delays $f_1, \ldots, f_5$ indexed in time order with $f_3$ being the peak, the signal energy contained in the group can be taken to be given by:

$$\Omega = (1-C_{f1f2})M_{f1} + (1-C_{f2f3})M_{f2} + M_{f3} + (1-C_{f3f4})M_{f4} + (1-C_{f4f5})M_{f5}$$

for weight computation according to the first example computation described above, with an assumption that only adjacent delays could be correlated to any significant extent. For such a five-delay group and the second example computation described above, the weights are:

$$w_{f1} = 1 - C_{f1f2}$$

$$w_{f2} = 1 - C_{f2f3}$$

$$w_{f3} = 1$$

$$w_{f4} = 1 - C_{f3f4}$$

$$w_{f5} = 1 - C_{f4f5}$$

For such a five-delay group and the third example computation, the weights are:

$$w_{f1} = a(1-\tau_2)$$

$$w_{f2} = a(1-\tau_1)$$

$$w_{f3} = a$$

$$w_{f4} = a(1-\tau_1)$$

$$w_{f5} = a(1-\tau_2)$$

for selected constants $a$, $\tau_1$, and $\tau_2$. As noted above, constant $a$ should be chosen between 0.8 and 1.5, with a particularly advantageous value of $a=1$, and $\tau_1$ and $\tau_2$ should be chosen between 0.4 and 1, with a particularly advantageous value of 0.75.

In general, the parameters $a$, $\beta$, and $\tau$ (whether there is one or more $\tau$) can be determined empirically or through numerical simulation by plotting bit error rate or a similar measure of sensitivity against received signal echo power with $a$, $\beta$, and $\tau$ as variable parameters.

It will be appreciated that the procedures described above are carried out repetitively as necessary to respond to the time-varying characteristics of the channel between the transmitter and receiver. These procedures are readily implemented by integrated circuits such as programmable processors and application-specific integrated circuits. Moreover, these example computations can be extended in a straightforward way for groups having more delays, with resulting increased computational effort of course. In addition, these computations can be generalized to include groups having non-adjacent correlated delays and to include computations for symbol-based interference cancellation, such as that described in U.S. patent application Ser. No. 09/344,899 cited above.

The steps of a computer program as illustrated in FIG. 3 for scaling path delay values in a communication system in which estimates of received symbols corresponding to the path delays are combined can be embodied in any computer-readable medium for use by or in connection with an instruction-execution system, apparatus, or device, such as a computer-based system, processor-containing system, or other system that can fetch instructions from a medium and execute the instructions.

As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Those skilled in the art will appreciate that this invention is not limited to the embodiments described above for purposes of illustration and that numerous alternative embodiments are also contemplated. In addition, the terms "comprises" and "comprising", as used in this description and the following claims, are meant as specifying the presence of stated features without precluding the presence of one or more other features. The scope of the invention is defined by the following claims rather than the foregoing description, and all equivalents consistent with the meaning of the claims are intended to be embraced therein.

What is claimed is:

1. A method of scaling path delay values in a communication system in which estimates of received symbols corresponding to the path delays are combined, comprising the steps of:
   getting a plurality of path delay values, including getting a set of temporal statistics of the path delay values, the set of temporal statistics including a correlation matrix, a normalized correlation matrix, and a mean energy vector;
   identifying the path delay values as either peak values or neighbor values;
   organizing the peak values and neighbor values into groups, wherein each group comprises at least one peak value; and
   for each group, determining a set of weight values $w_1$ wherein the weight values in a set correspond to respective path delays and are based on at least the set of weight values w determined for the respective group and the set of temporal statistics; and
   determining the set of weight values w based on $w=(R+\beta I)^{-1}(|\Omega|M^*+\beta 1)$.

in which R is the correlation matrix, M is the mean energy vector, β is a selectable parameter, and Ω depends on the normalized correlation matrix and on the mean energy vector and is related to uncorrelated energy or signal-to-interference ratio of a group.

2. The method of claim 1, wherein the weight values are determined by at least the steps of:
   checking the groups for duplicated path delay values and selecting a weight value from the weight values determined for the duplicated path delay values as either one of the weight values for the duplicated path delay values or a combination of the weight values for the duplicated path delay values.

3. The method of claim 1, wherein a set of weight values is determined based on signal correlations.

4. The method of claim 3, wherein in the set of weight values, the weight value for a peak value is a constant and the weight values for neighbor values are the constant less signal correlations.

5. The method of claim 1, wherein a set of weight values is determined as selected constants.

6. A receiver for signals transmitted in a digital communication system, the signals including transmitted symbols, comprising:
   a delay selector that determines sets of path delays for received signal echoes;
   a propagation channel estimator that determines estimates of an impulse response of a channel through which the transmitted signals have propagated;
   a demodulator that determines estimates of the transmitted symbols;
   a propagation channel weights computer that determines weight values for path delays determined by the delay selector based on relative correlations of the path delays by identifying the path delays as either peaks or neighbors, organizing the peaks and neighbors into groups, wherein each group comprises at least one peak, and determining a set of weight values w for each group, wherein each weight value in a set corresponds to a respective path delay and is based on at least the set of weight values w determined for the respective group and a set of temporal statistics of the path delays, the set of temporal statistics including a correlation matrix, a normalized correlation matrix, and a mean energy vector;
   a combiner that combines the estimates of the impulse response, the estimates of the transmitted symbols, and the weight values, wherein the weight values scale the estimates for the combiner;
   wherein, the set of weight values w is determined based on $w=(R+\beta I)^{-1}(|\Omega|M^*+\beta 1)$.

in which R is the correlation matrix, M is the mean energy vector, β is a selectable parameter, and Ω depends on the normalized correlation matrix and on the mean energy vector and is related to uncorrelated energy or signal-to-interference ratio of a group.

7. The receiver of claim 6, wherein the propagation channel weights computer determines weight values for path delays by checking the groups for duplicated path delays and selecting a weight value from the weight values determined for the duplicated path delays as either one of the weight values for the duplicated path delays or a combination of the weight values for the duplicated path delays.

8. The receiver of claim 6, wherein the propagation channel weights computer determines weight values based on received signal correlations.

9. The receiver of claim 8, wherein in a set of weight values, the weight value for a peak value is a constant and the weight values for neighbor values are the constant less received signal correlations.

10. The receiver of claim 6, wherein the propagation channel weights computer determines weight values as selected constants.

11. A computer-readable medium storing a computer program for scaling path delay values in a communication system in which estimates of received symbols corresponding to the path delays are combined, wherein the computer program performs the steps of:

getting a plurality of path delay values, including getting a set of temporal statistics of the path delay values, the set of temporal statistics including a correlation matrix, a normalized correlation matrix, and a mean energy vector;

identifying the path delay values as either peak values or neighbor values;

organizing the peak values and neighbor values into groups, wherein each group comprises at least one peak value; and for each group, determining a set of weight values w, wherein each weight value in a set corresponds to a respective path delay and is based on at least the set of weight values w determined for the respective group and the set of temporal statistics determining the set of weight values w based on $$w=(R+\beta I)^{-1}(|\Omega|M^*+1).$$

in which R is the correlation matrix, M is the mean energy vector, $\beta$ is a selectable parameter, and $\Omega$ depends on the normalized correlation matrix and on the mean energy vector and is related to uncorrelated energy or signal-to-interference ratio of a group.

12. The computer-readable medium of claim 11, wherein the computer program determines weight values by at least the steps of:

checking the groups for duplicated path delay values and selecting a weight value from the weight values determined for the duplicated path delay values as either one of the weight values for the duplicated path delay values or a combination of the weight values for the duplicated path delay values.

13. The computer-readable medium of claim 12, wherein the computer program performs the step of getting a plurality of path delay values by at least getting a set of temporal statistics of the path delay values, and a set of weight values is determined based on the set of statistics.

14. The computer-readable medium of claim 12, wherein a set of weight values is determined either based on signal correlations or as selected constants.

* * * * *

UNITED STATES PATENT AND TRADEMARK OFFICE
CERTIFICATE OF CORRECTION

PATENT NO. : 7,239,677 B2
APPLICATION NO. : 10/426254
DATED : July 3, 2007
INVENTOR(S) : Jonsson et al.

It is certified that error appears in the above-identified patent and that said Letters Patent is hereby corrected as shown below:

On the Title Page, in item (73), under "Assignee", in Column 1, Line 1, delete "L M" and insert -- LM --, therefor.

In Column 5, Line 23, delete "$+|W_n|^2$" and insert -- $+|w_n|^2$ --, therefor.

In Column 9, Line 55, in Claim 1, delete "$w_1$" and insert -- w, --, therefor.

In Column 11, Line 25, in Claim 11, delete "$(|\Omega|M*+1)$" and insert -- $(|\Omega|M*+\beta 1)$ --, therefor.

Signed and Sealed this

Sixteenth Day of September, 2008

JON W. DUDAS
*Director of the United States Patent and Trademark Office*